US008868723B2

(12) United States Patent
Cho

(10) Patent No.: US 8,868,723 B2
(45) Date of Patent: Oct. 21, 2014

(54) MANAGEMENT SERVER AND METHOD OF DISCOVERING NETWORK THEREOF

(75) Inventor: Jae-kyung Cho, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 986 days.

(21) Appl. No.: 12/488,725

(22) Filed: Jun. 22, 2009

(65) Prior Publication Data

US 2010/0121949 A1 May 13, 2010

(30) Foreign Application Priority Data

Nov. 12, 2008 (KR) .................. 10-2008-0112437

(51) Int. Cl.
*G06F 15/16* (2006.01)
*G06F 15/173* (2006.01)
*H04L 12/24* (2006.01)

(52) U.S. Cl.
CPC .................................. *H04L 41/12* (2013.01)
USPC ........... 709/224; 709/217; 709/219; 709/228; 709/248

(58) Field of Classification Search
USPC ........................................................ 709/224
See application file for complete search history.

(56) References Cited

U.S. PATENT DOCUMENTS

| 7,640,546 | B2* | 12/2009 | Zarenin et al. | 718/102 |
|---|---|---|---|---|
| 7,984,132 | B2* | 7/2011 | Park et al. | 709/223 |
| 2003/0005100 | A1* | 1/2003 | Barnard et al. | 709/223 |
| 2007/0237141 | A1* | 10/2007 | Marchese | 370/389 |
| 2008/0123551 | A1* | 5/2008 | Hanes | 370/254 |
| 2008/0159169 | A1* | 7/2008 | Benfield et al. | 370/254 |
| 2008/0189405 | A1* | 8/2008 | Zarenin et al. | 709/224 |
| 2009/0327395 | A1* | 12/2009 | Park et al. | 709/202 |
| 2010/0046395 | A1* | 2/2010 | Sivaramakrishna Iyer et al. | 370/254 |

FOREIGN PATENT DOCUMENTS

JP 2007-214916 8/2007

OTHER PUBLICATIONS

Korean Office Action dated Aug. 13, 2014 issued KR Application No. 10-2008-0112437.

* cited by examiner

*Primary Examiner* — Tauqir Hussain
(74) *Attorney, Agent, or Firm* — Stanzione & Kim, LLP

(57) ABSTRACT

A method of discovering a network device includes setting a number of network devices to be discovered, and repeatedly discovering at least one network device with one or more different discovering methods until the set number of network devices are discovered. Accordingly, a network device to be discovered is discovered from non-discovered network devices more effectively through repetitive discovering operations.

20 Claims, 8 Drawing Sheets

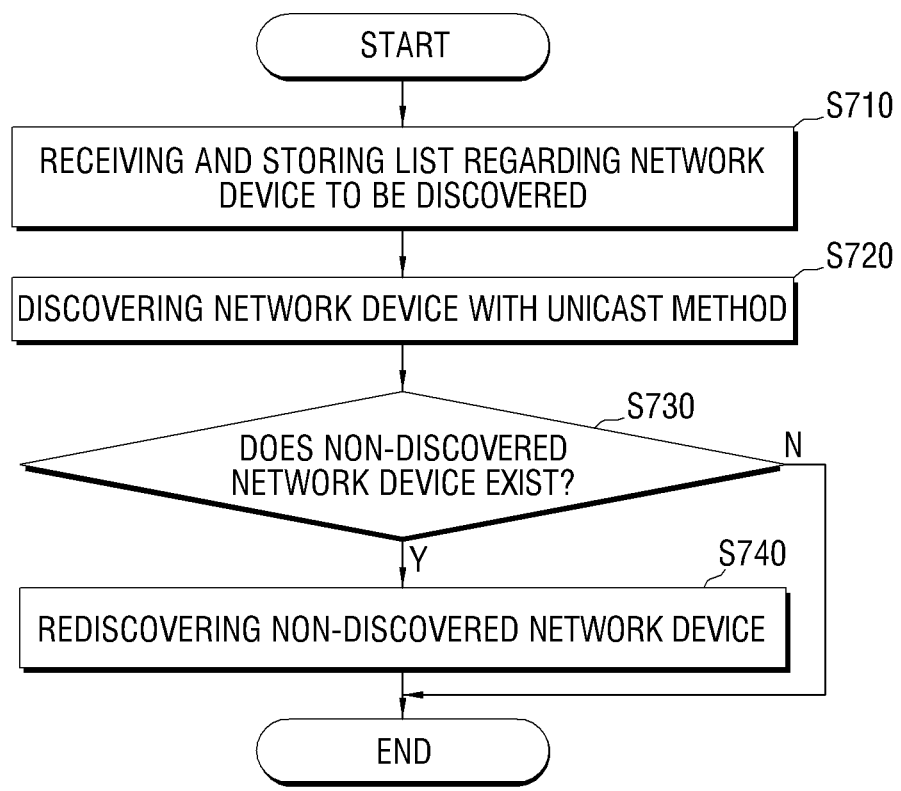

MANAGEMENT SERVER AND METHOD OF DISCOVERING NETWORK THEREOF

CROSS-REFERENCE TO RELATED APPLICATIONS

This application claims priority under 35 U.S.C. §119 (a) from Korean Patent Application No. 10-2008-112437, filed on Nov. 12, 2008, in the Korean Intellectual Property Office, the disclosure of which is incorporated herein by reference in its entirety.

BACKGROUND

1. Field of the Invention

The present general inventive concept relates to a management server and a method of discovering a network device thereof, and more particularly, to a management server which performs repetitive discovering operations to discover a network device from non-discovered network devices and a method of discovering a network device thereof.

2. Description of the Related Art

Recently, users can manage several network devices connected to a network at a distant place due to the advance of network technology. Particularly, large corporations are increasingly requiring a technology capable of collectively managing network devices of several branch offices connected to a network at a head office.

In order to manage the network devices of the several branch offices, a process of discovering a network device should be performed first. The process of discovering a network device may precede a process of checking the status of consumable goods of a distant place or a process of installing a program such as a universal printer driver (UPD) into a user terminal of a distant place.

According to a conventional method for discovering a network device, however, a command to discover a network device should be input N times to discover the N network devices and thus may feel inconvenient to the user.

Also, if a network device which has not been discovered is rediscovered, a network device which has been already discovered is likely to be rediscovered.

SUMMARY

Example embodiments of the present general inventive concept provide a management server which performs repetitive discovering operations to discover a network device from non-discovered network devices and a method of discovering a network device thereof.

Additional embodiments of the present general inventive concept will be set forth in part in the description which follows and, in part, will be obvious from the description, or may be learned by practice of the general inventive concept.

Example embodiments of the present general inventive concept may be achieved by providing a method of discovering a network device in a network which includes at least one network devices and a management server, the method including setting a number of network device to be discovered, and repeatedly discovering the at least one network device with one or more different discovering methods until the set number of network devices are discovered.

The discovering may include discovering the network device by discovering a specific object and discovering a non-specific object.

The method may further include setting a discovery repetition period, and the discovering may include discovering the network device during the set discovery repetition period until the set number of network devices are discovered.

The discovering may further include comparing a number of network devices which have been discovered and the set number, and when the number of network devices which have been discovered is not equal to the set number, rediscovering a non-discovered network device in the network.

The discovering may include discovering the network device in at least one discovering method among a broadcast method of service location protocol (SLP) and simple network management protocol (SNMP), a multicast method, and a unicast method according to a pre-set standard.

The discovering may include designating an IP address of a specific network device or an IP address range of a specific network device according to a unicast method.

The method may further include when the set number of network device is not discovered until the discovering is performed a predetermined number of times, discovering the network device in the unicast method using an IP address which is individually assigned to each network device in a pre-stored list.

The method may further include determining whether a non-discovered network device exists by comparing an IP address of the network device which has been discovered with a unicast method and an IP address of the network device to be discovered.

The method may further include when a non-discovered network device exists, rediscovering to discover the non-discovered network device.

Example embodiments of the present general inventive concept may also be achieved by providing a method of discovering a network device in a network which includes at least one network device and a management server, the method including receiving and storing a list of at least one network device to be discovered, discovering the at least one network device with a unicast method using an IP address which is individually assigned to each network device in the list, determining whether a non-discovered network device exists by comparing an IP address of the network device which has been discovered and an IP address of the network device to be discovered, and when a non-discovered network device exists, rediscovering to discover the non-discovered network device.

The method may further include setting a discovery repetition period, and the rediscovering may include discovering the network device during that the set discovery repetition period until all of the network devices to be discovered are discovered.

The method may further include storing a list of the at least one network device which has been discovered, and the determining may include determining whether the non-discovered network device exists by comparing the list of the network devices to be discovered and the stored list of the network devices which have been discovered.

The method may further include, when a network device is newly discovered by the rediscovering, adding the newly discovered network device to the stored list of the network devices which have been discovered.

Example embodiments of the present general inventive concept may also be achieved by providing a management server connected to at least one network device, the management server including an input unit to set a number of network devices to be discovered, and a first discovering unit to repeatedly discover the at least one network device with one or more different discovering methods until the set number of network devices are discovered.

The first discovering unit may discover the network device by discovering a specific object and discovering a non-specific object.

The management server may further include a setting unit to set a discovery repetition period, and the first discovering unit may discover the network device during the discovery repetition period until the set number of network devices are discovered.

The first discovering unit may include a comparison unit to compare a number of network devices which have been discovered and the set number, and a rediscovering unit to rediscover a non-discovered network device in the network when the number of network devices is not equal to the set number.

The first discovering unit may discover the network device in at least one discovering method among a broadcast method of SLP and SNMP, a multicast method, and an unicast method according to a pre-set standard.

The first discovering unit may designate an IP address of a specific network device or an IP address range of a specific network device according to a unicast method.

The management server may further include a second discovering unit to discover the network device in the unicast method using an IP address which is individually assigned to each network device in a pre-stored list when the set number of network devices is not discovered until the discovering operation is performed a predetermined number of times.

The management server may further include a determination unit to determine whether a non-discovered network device exists by comparing an IP address of the network device which has been discovered with a unicast method and an IP address of the network device to be discovered.

When the determination unit determines that a non-discovered network device exits, the second discovery unit may rediscover the non-discovered network.

Example embodiments of the present general inventive concept may also be achieved by providing a management server connected to at least one network device, the management server including a storage unit to receive and store a list of at least one network device to be discovered, a discovering unit to discover the network device by a unicast method using an IP address which is individually assigned to each network device in the list, a determination unit to determine whether a non-discovered network device exists by comparing an IP address of the network device which has been discovered and an IP address of the network device to be discovered, and a control unit to rediscover a non-discovered network device if the non-discovered network device exists.

The management server may further include a setting unit to set a discovery repetition period, and the control unit may discover the network device during the set discovery repetition period until all of the network devices to be discovered are discovered.

The storage unit may store a list of the network device which has been discovered, and the determination unit may determine whether the non-discovered device exists by comparing the list of network devices to be discovered and the stored list of network devices which have been discovered.

The control unit may add the newly discovered network device to the stored list of the network devices which have been discovered if a network device is newly discovered by the rediscovering.

Exemplary embodiments of the present general inventive concept may also provide a method of discovering a network device in a network which comprises at least one network device and a management server, the method including receiving a set number of network devices to be discovered and a discovery time period with an input device, and repeatedly discovering the at least one network device during the discovery time period until the set number of network devices are discovered.

Exemplary embodiments of the present general inventive concept may also provide a method of discovering a network device in a network having at least one network device and a management server, the method including receiving a list of at least one network device to be discovered a with an input unit, discovering at least one network device using an IP address which is individually assigned to each network device in the list and storing a list of discovered network devices, and determining whether a non-discovered network device exists by comparing the list of the at least one network device to be discovered and the stored list of discovered network devices, and rediscovering to discover the non-discovered network device.

Exemplary embodiments of the present general inventive concept may also provide a method of discovering a network device in a network having at least one network device and a management server, the method including receiving a list of at least one network device to be discovered a with an input unit, discovering at least one network device with one or more different discovering methods and storing a list of discovered network devices, and determining whether a non-discovered network device exists by comparing the list of the at least one network device to be discovered and the stored list of discovered network devices, and rediscovering to discover the non-discovered network device.

Exemplary embodiments of the present general inventive concept may also provide a method of discovering a network device in a network having at least one network device and a management server, the method including receiving a set number of network devices to be discovered and a discovery time period with an input unit, discovering at least one network device during the discovery time period, determining if the number of discovered devices is equal to the received set number of network devices to be discovered, and rediscovering at least one network device during the discovery time period when the number of discovered devices is not equal to the received set number of network devices to be discovered.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIG. 7 is a flowchart illustrating a method of discovering a network device according exemplary embodiments of the present general inventive concept.

DETAILED DESCRIPTION OF THE EMBODIMENTS

Figure 1:
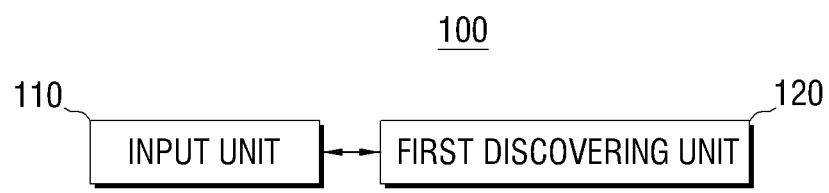
FIG. 1 is a block diagram illustrating a management server according to exemplary embodiments of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a management server according to an exemplary embodiment of the present general inventive concept. Referring to FIG. 1, a management server 100 may include an input unit 110 and a first discovering unit 120.

The input unit 110 receives a setting for a number of network devices to be discovered (e.g., the number of network devices to be discovered may be set to 10, 100, or 1000, or any other suitable number). Also, the input unit 110 may receive a command to a start discovering operation, along with the setting for the number of network devices to be discovered. As discussed in detail below, a discovering operation may include using the set number of network devices to discover the network devices in a network.

The first discovering unit 120 repetitively attempts to discover and/or discovers network devices using at least one method until the number of network devices set through the input unit 110 is discovered. Using the setting for the number of the network device to be discovered received by the input unit 110, the first discovering unit 120 may make one or more attempts to discover network devices in the network using one or more discovering methods until the set number of network devices is discovered. The various methods used may include, for example, a broadcast method of service location protocol (SLP) and simple network management protocol (SNMP), a multicast method, and a unicast method according to a pre-set standard, as described in detail below.

Accordingly, network devices can be discovered, including the set number of network devices to be discovered, with a single command to discover the network devices.

Figure 2A:
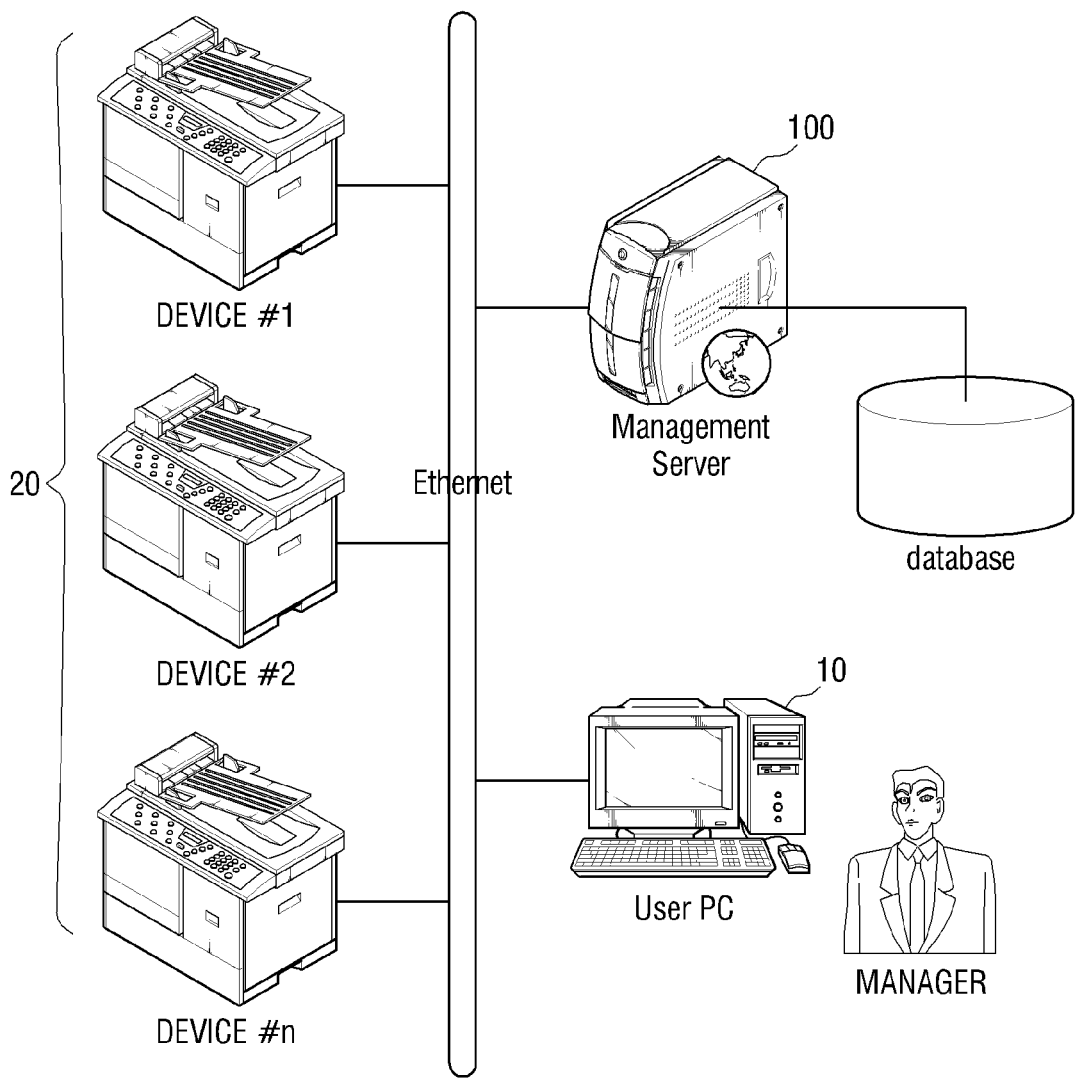
FIGS. 2A and 2B are views illustrating a general network environment in which a management server attempts to discover a network device according to exemplary embodiments of the present general inventive concept.
Figure 2B:
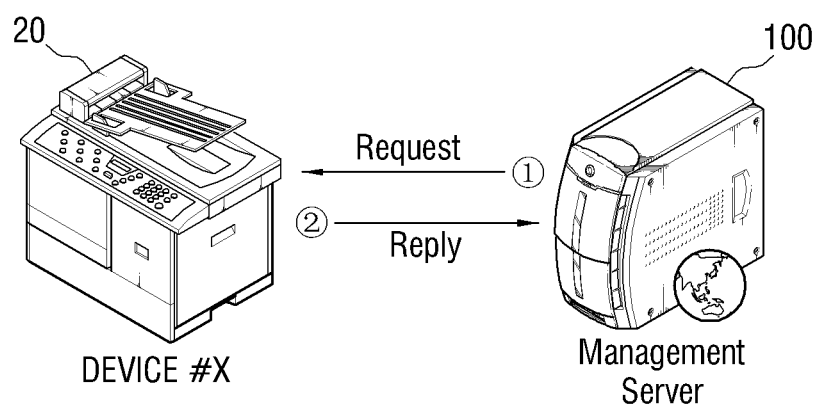

For the convenience of explanation, a network environment including a management server is described with reference to FIGS. 2A and 2B. FIGS. 2A and 2B are views illustrating a general network environment in which a management server attempts to discover a network device.

Referring to FIG. 2A, a network environment may include a manager 10, at least one network device 20, and a management server 100. The network environment may further include a user terminal (not illustrated). In FIG. 2A, a single network in which the manager 10, the network device 20, and the management server 100 are connected to one another through Ethernet is illustrated. Although FIG. 2A illustrates that the manager 10, the network device 20, and the management server are connected via Ethernet, these devices may also be connected via a local area network, a wide area network, the Internet, or any other suitable wired or wireless communications network. Also, FIG. 2A illustrates a single network, two or more networks that are communicatively connected that may have one or more network devices, management servers, and/or managers may be used.

That is, the network illustrated in FIG. 2A may be located, for example, at a head office of a corporation. Such a network may be connected to one or more different networks of, for example, branch offices located at different places through a router (not illustrated) connected to the Ethernet or other suitable communications network. Accordingly, the manager 10 of the head office may manage or discover network devices of the head office and/or of the branch offices.

Referring to FIG. 2B, a general method of discovering a network device is illustrated. If the management server 100 transmits a "Request" for discovering a network device to several network devices 20 connected to the network, the network device 20 transmits a "Reply" in response to the "Request" to the management server 100. According to the "Reply" transmitted from the network device 20, the management server 100 discovers the network device 20. If a 'Reply' is not transmitted from a network device for a predetermined time after the management server 100 transmits the "Request", the management server 100 cannot discover the network device 20 using the general method of discovering a network device, but may discover the device using one or more different discovery methods, described in detail below.

Figure 3:
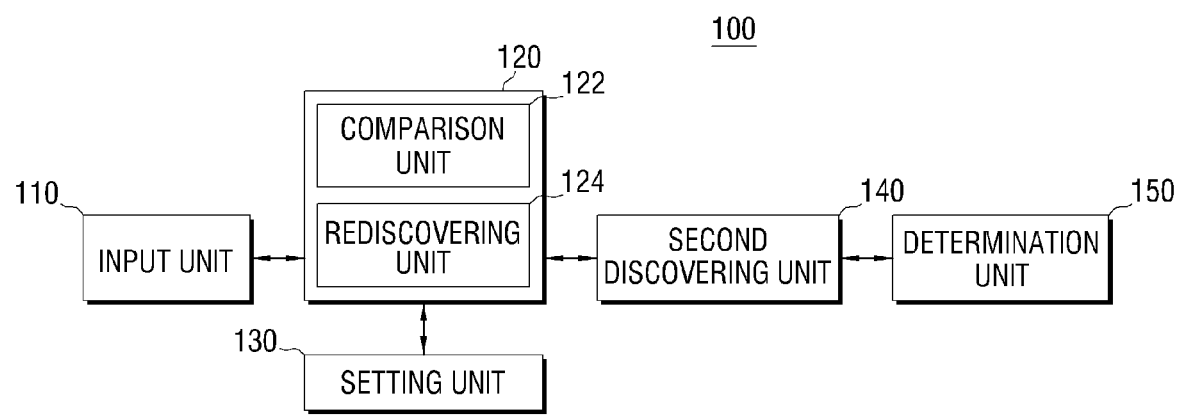
FIG. 3 is a block diagram illustrating the management server of FIG. 1 in detail.

FIG. 3 is a block diagram illustrating the management server of FIG. 1 in detail. Referring to FIG. 3, in addition to the input unit 110 and the first discovering unit 120, the management server 100 may further include a setting unit 130, a second discovering unit 140, and a determination unit 150. The first discovering unit 120 may include a comparison unit 122 and a rediscovering unit 124.

If the number of the network device to be discovered is set through the input unit 110, the first discovering unit 120 repeatedly attempts to discover and/or discovers one or more network devices using at least one network device discovery method until the set number of network devices is discovered.

The first discovering unit 120 may apply a different discovering method each time that repetitive discovering operation for the network device with the set number is performed. More specifically, the first discovering unit 120 applies at least one of a broadcast method of service location protocol (SLP), a simple network management protocol (SNMP), any other suitable network service or management protocol, a multicast method, and a unicast method according to a pre-set standard, differently each time that repetitive discovering operation is performed.

The unicast method may be suitable for discovering a specific object because the unicast method designates an IP address or an IP address range, whereas the other methods such as the broadcast method of SLP and SNMP and the multicast method are suitable for discovering an non-specific object because these methods do not designate an IP address. The first discovering unit 120 may use a mixed method of the above-mentioned two types of methods, such as a specific object discovering method and a non-specific object discovering method.

The first discovering unit 120 may be set to use the broadcast method of SLP and SNMP, the multicast method of SNMP, and the unicast method of SNMP in sequence each time that repetitive discovering operation for the network device is performed.

For example, if 1000 network devices are set to be discovered through the input unit 110, the first discovering unit 120 discovers 500 network devices according to the SLP in the first discovering phase, discovers 250 network devices according to the broadcast method of SNMP in the second discovering phase, discovers 150 network devices according to the multicast method of SNMP in the third discovering phase, and then discovers 100 network devices according to the unicast method of SNMP in the fourth discovering phase, so that 1000_network devices can be finally discovered.

In the above example, if the first discovering unit 120 has discovered 40 network devices according to the unicast method of SNMP in the fourth discovering phase, the repetitive discovering operation is performed to discover the remaining 60 network devices according to one of the aforementioned methods, so that 100 network devices can be finally discovered.

A priority may be set to be assigned to either the SLP or the SNMP. However, the broadcast method of SNMP can transmit a 'Request' for discovering all of the network devices residing in the network, but may only discover a network device residing in the closest network (e.g., the network illustrated in FIG. 2A) due to the effect of traffic.

The multicast method of SNMP can transmit a 'Request' for discovering to some of the network devices (nodes) residing in the network, but may discover a network device residing in the relatively farther network (e.g., a different network that is communicatively coupled to the closest network) compared to the broadcast method of SNMP.

The unicast method, which designates an IP address range of a network device (node) residing in the network or directly inputs an IP address of a network device, can discover a network device residing in the farthest network. In this case, the IP address may be assigned to respective network device in advance in various methods that include, but are not limited to, a dynamic host configuration protocol (DHCP) and a BOOTstrap protocol (BOOTP).

For example, if the management server 100 of the head office network attempts to discover network devices, the first discovering unit 120 can discover a network device residing in the head office network in the broadcast method, can rediscover a network device residing in a branch office 1 network connected to the head office network in the multicast method, and can rediscover a network device residing in a branch office 2 network connected to the branch office 1 network (that is, the branch office 2 is farthest from the head office network) in the unicast method.

Thus, in the example above, the first discovering unit 120 may perform repetitive discovering operations from a branch office network which is relatively closer to the head office network to a branch office network which is relatively farther from the head office network using different methods.

The first discovering unit 120 may include a comparison unit 122 and a rediscovering unit 124. The comparison unit 122 may compare the number of network devices which has been discovered with the set number. To increase effectiveness in of the comparisons performed by the comparison unit 122, the management server 100 may include a storage unit (not illustrated) to store a list regarding network devices which have been discovered and a list regarding a network device to be discovered. The list regarding the network devices which have been discovered may be updated and stored to the storage unit (not illustrated) each time that the repetitive discovering operation is performed, or stored at predetermined time intervals, or stored after an update is performed.

If the result of comparison is that the numbers are equal to each other, the rediscovering unit 124 stops discovering. If the numbers are not equal, the rediscovering unit 124 rediscovers a non-discovered network device in the network. If all of the network devices to be discovered are not discovered, the rediscovering unit 124 performs repetitive discovering operations until all of the network devices to be discovered are discovered. Alternatively, the network devices may be rediscovered at predetermined time intervals.

The setting unit 130 may receive a setting for a discovery repetition period. The discovery repetition period may be a particular period of time or time interval that discovering network devices may be performed using, for example, the first discovering unit 120. The first discovering unit 120 discovers a network device every time that the discovery repetition period occurs until the set number of network devices is discovered.

For example, if the first discovering unit 120 discovers 500 of 1000 network devices in the first discovering phase and if the setting unit 130 receives a setting for a discovery repetition period, indicating that rediscovering operation should be performed from 4 o'clock p.m. on $25^{th}$, the remaining 500 network devices are rediscovered from 4 o'clock p.m. on $25^{th}$. Since several minutes to several ten minutes are taken to discover all of network devices at once, the discovery repetition period may be set to 1 day or 2 days, for example.

If the first discovering unit 120 has not discovered the set number of network devices until the discovering operation has been performed a predetermined number of times, the second discovering unit 140 may discover a network device in the unicast method using an IP address which is individually assigned to each network device of the pre-stored list.

In the unicast method, since an IP address of a network device or an IP address range of a network device can be designated, the number of discovered network devices may initially be less than the total number of network devices, but all of the network devices may be discovered through the repetitive discovering operations.

That is, the second discovering unit 140 may supplement the function of the first discovering unit 120 but this should not be considered as limiting. The second discovering unit 140 can discover the network device by itself.

The determination unit 150 may determine whether a non-discovered network device exists or not by comparing the IP address of the network device which has been discovered, for example, by the unicast method and the IP address of the network device to be discovered. The second discovering unit 140 stops discovering if a non-discovered network device does not exist, and rediscovers a network device if a non-discovered network device exists.

Although FIG. 3 illustrates that the second discovering unit 140 and the determination unit 150 are separate units, the determination unit 150 may be a component included in the second discovering unit 140.

As described above, the first discovering unit 120 may the broadcast method of SLP and SNMP, the multicast method of SNMP, and the unicast method of SNMP, which designates an IP range, to discover an non-specific network device (e.g., a network device for which no IP address is assigned). On the other hand, the second discovering unit 140 may use the unicast method of SNMP, in which an IP address is designated, to discover a specific network device (e.g., a device which has an IP address assigned to it). Although it is possible for only one of the first discovering unit 120 and the second discovering unit 130 to discover all of the network devices to be discovered, the first discovering unit 120 and the second discovering unit 140 may cooperate with each other complementarily to, for example, decrease the amount of time to discover the network devices.

Figure 4:
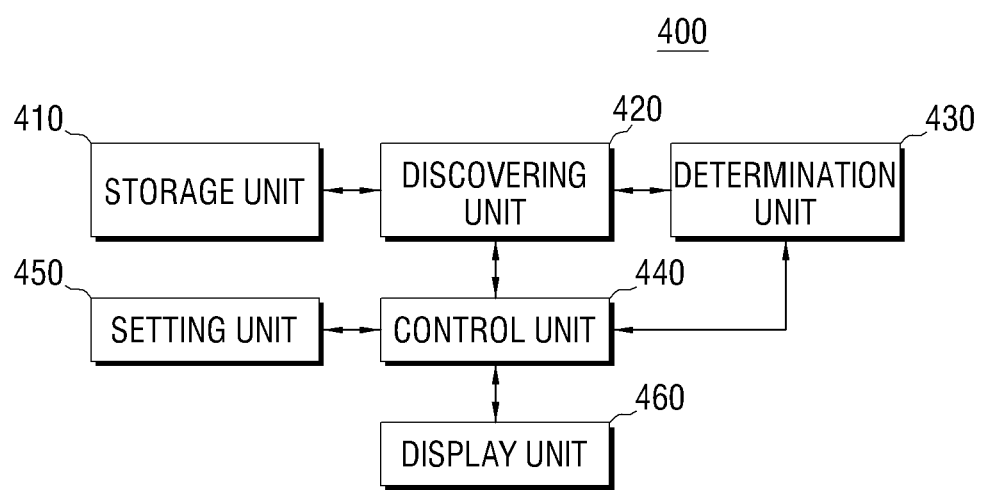
FIG. 4 is a block diagram illustrating a management server according to exemplary embodiments of the present general inventive concept.

FIG. 4 is a block diagram illustrating a management server according to exemplary embodiments of the present general inventive concept. FIG. 4 illustrates an example of discovering a specific network without discovering an unspecific network.

Referring to FIG. 4, a management server 400 may include a storage unit 410, a discovering unit 420, a determination unit 430, a control unit 440, a setting unit 450, and a display unit 460.

The storage unit 410 receives and stores a list regarding a network device to be discovered. The management server 400 according to another exemplary embodiment of the present general inventive concept can directly designate and discover a network device having a specific IP address in the unicast method, so that a list regarding a network device to be discovered and a list regarding a network device which has been discovered can be stored. Also, identity information of the network device which has been discovered (e.g., an IP address, device description information, network name that the device is connected to, etc.) is updated and stored to the storage unit (not illustrated) each time that repetitive discovering operation is performed. Alternatively, the identity information of the network device may be stored when the information changes.

The discovering unit 420 may discover a network device using a unicast method described above using an IP address which is individually assigned to each network device in the list.

The determination unit 430 determines whether a non-discovered network device exists by comparing the IP address of the network device which has been discovered and the IP address of the network device to be discovered.

The control unit 440 may stop discovering if a non-discovered device does not exist and rediscovers a non-discovered device if the non-discovered exists. The control unit 440 may generate a signal representing a screen interface to display a process performed by the discovering unit 420, the determination unit 430, and/or the setting unit 450. The display unit 460 may receive the signal generated by the control unit 440, and may display the screen interface, where the interface may include, for example, a character, text, images, icons, or any other suitable information, or any combination thereof, to describe the process performed by the management server 400 in communication with devices, such as one or more network devices.

The setting unit 450 may receive a setting for a discovery repetition period. The control unit 440 discovers a network device during the set discovery repetition period until all of the network devices to be discovered are discovered. The display unit 460 may display settings for a discovery repetition period received by the setting unit 450.

The determination unit 430 determines whether a non-discovered network device exists or not by comparing the list of one or more network devices to be discovered, and the stored list of the discovered network devices.

If a new network device is discovered through the rediscovering operation, the control unit 440 may add the new network device to the pre-stored list of the discovered network devices.

Figure 5:
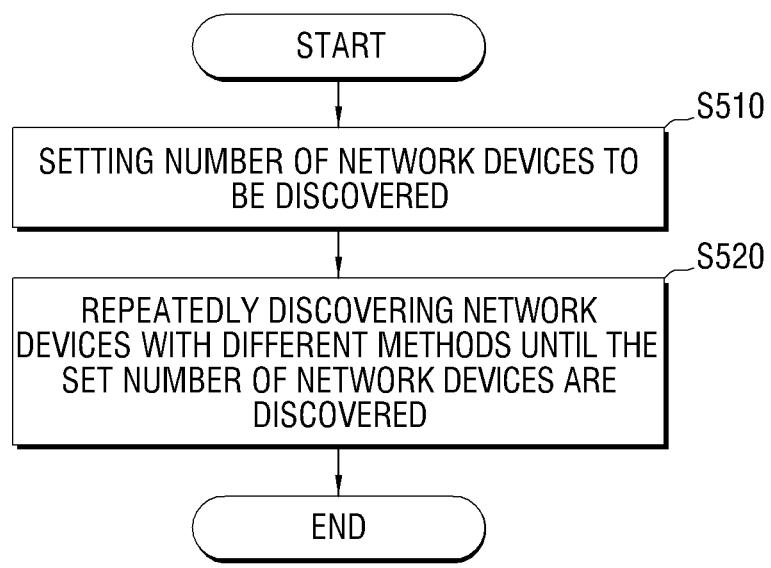
FIG. 5 is a flowchart illustrating a method of discovering a network device according to exemplary embodiments of the present general inventive concept.

FIG. 5 is a flowchart illustrating a method of discovering a network device according to exemplary embodiments of the present general inventive concept. Referring to FIG. 5, the number of network devices to be discovered is set in operation S510 and the network devices are repeatedly discovered with one or more different discovering methods until the set number of network device is discovered in operation S520. This method of discovering the network device may be performed by the management server 100 or 400.

According to an exemplary embodiment of the present general inventive concept, the network device may be a printer, a copier, a facsimile machine, and a multifunction peripheral, and also may be a terminal device such as a user PC. For example, a manager or other suitable user may attempt to discover a terminal device connected to a network to install a program such as universal printer driver (UPD) to the terminal device.

Figure 6:
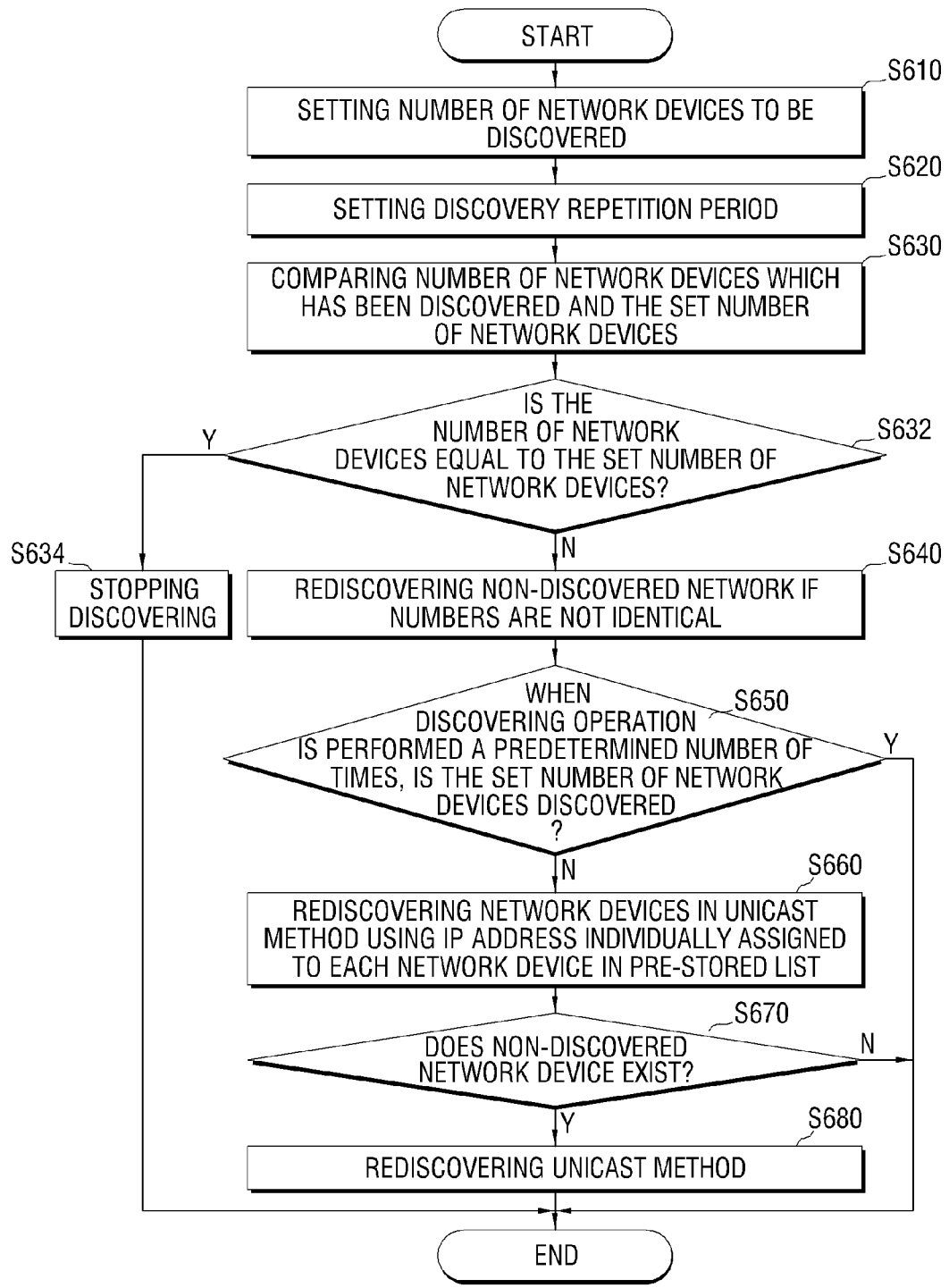
FIG. 6 is a flowchart illustrating the method of FIG. 5 in detail.

FIG. 6 is a flowchart illustrating the method of discovering the network device of FIG. 5 in detail. Referring to FIG. 6, the number of network devices to be discovered is set in operation S610 and a discovery repetition period is set in operation S620. The operation of setting a discovery repetition period may be performed after the operation of discovering the network device.

In operation S630, the number of network device which has been discovered is compared with the set number of network device. At operation S632, it is determined whether the number of network devices is equal to the set number of network devices. If the numbers are identical, the discovering operation is stopped at operation S634, and, if the numbers are not identical, a non-discovered network device is rediscovered in operation S640.

It is determined whether the set number of network device is discovered or not when the discovering operation has been performed a predetermined number of times in operation S650. If the set number of network device is not discovered in operation S650, the network devices are rediscovered, for example, with the unicast method using an IP address which is individually assigned to each network device in the pre-stored list in operation S660. If none of the network devices are discovered in operation S640, the network device is discovered in the unicast method in operation S660 according to the determination of operation S650.

At operation S670, it is determined again whether a non-discovered network device exists or not. If a non-discovered network device exists in operation S670, the network devices are repeatedly discovered with the unicast method in operation S680.

The operations S610 to S640 may be performed as a general network discovering method to discover a non-specific network device to which no IP address is assigned, and the operations S650 to S680 are performed as a network discovering method to discover a specific network device for which an IP address is assigned.

FIG. 7 is a flowchart illustrating a method of discovering a network device according to exemplary embodiments of the present general inventive concept. Referring to FIG. 7, a list regarding network devices to be discovered is input and stored in operation S710.

The network device is discovered by, for example, the unicast method in operation S720. It is determined whether a non-discovered network device exists or not in operation S730. More specifically, it is determined whether a non-discovered network device exists or not by comparing a list of network devices to be discovered and a stored list of discovered network devices in operation S730.

If a non-discovered device does not exit in operation S730, the discovering operation is stopped. If a non-discovered device exists, rediscovering operation is performed in operation S740.

If a network device is newly discovered through the rediscovering operation, the new network device may be added to the pre-stored list of discovered network devices. Accordingly, the network devices are updated if a network device is rediscovered.

An operating of setting a discovery repetition period (not illustrated) may be further included. This operation may be performed in any order before the rediscovering operation is performed.

In the method illustrated in FIG. 7, an IP address for a network device may be initially input to discover a specific network device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A method of discovering a network device in a network which comprises at least one network device and a management server, the method comprising:
   setting a number of network devices to be discovered;
   setting a discovery repetition period; and
   repeatedly discovering the at least one network device with one or more different discovering methods until the set number of network devices are discovered, the discovering including discovering the at least one network device by discovering a specific object and discovering a non-specific object, the discovering including:
      comparing a number of network devices which have been discovered and the set number; and
      when the number of network devices which have been discovered is not equal to the set number, rediscovering a non-discovered network device in the network; and
   determining whether a non-discovered network device exists by comparing an IP address of the network device which has been discovered and an IP address of the network device to be discovered,
   wherein the discovering methods include a broadcast method, a multicast method and an unicast method and one of the discovering methods are performed according to a range of the network where the network device reside, and
   wherein the discovering comprises discovering the network device during the set discovery repetition period until the set number of network devices are discovered.

2. The method as claimed in claim 1, wherein the discovering comprises:
   discovering the network device in at least one discovering method among a broadcast method of service location protocol (SLP) and simple network management protocol (SNMP), a multicast method, and a unicast method according to a pre-set standard.

3. The method as claimed in claim 1, wherein the discovering comprises:
   designating an IP address of a specific network device or an IP address range of the specific network device according to a unicast method.

4. The method as claimed in claim 1, further comprising:
   when the set number of network device is not discovered until the discovering is performed a predetermined number of times, discovering the network device in the unicast method using an IP address which is individually assigned to each network device in a pre-stored list.

5. The method as claimed in claim 1, further comprising:
   when the non-discovered network device exists, rediscovering with the one or more different discovering methods to discover the non-discovered network device.

6. A method of discovering a network device in a network which comprises at least one network device and a management server, the method comprising:
   receiving and storing a list of a least one network device to be discovered;
   setting a discovery repetition period;
   discovering the at least one network device with a unicast method using an IP address which is individually assigned to each network device in the list, the discovering including:
      comparing a number of network devices which have been discovered and a set number; and
      when the number of network devices which have been discovered is not equal to the set number, rediscovering a non-discovered network device in the network; and
   determining whether a non-discovered network device exists by comparing an IP address of the network device which has been discovered and an IP address of the network device to be discovered; and
   when the non-discovered network device is determined to exist, rediscovering with different discovery methods to discover the non-discovered network device,
   wherein the different discovery methods including a broadcast method or a multicast method and one of the different discovery methods are performed according to a range of the network where the network device reside, and
   wherein the rediscovering comprises discovering the network device during the set discovery repetition period until the set number of network devices are discovered.

7. The method as claimed in claim 6, further comprising:
   storing a list of the at least one network device which has been discovered,
   wherein the determining comprises determining whether the non-discovered network device exists by comparing the list of the network devices to be discovered and the stored list of the network devices which have been discovered.

8. The method as claimed in claim 6, further comprising:
   when a network device is newly discovered by the rediscovering, adding the newly discovered network device to the stored list of the network devices which have been discovered.

9. A management server apparatus connected to at least one network device, the management server apparatus comprising:
   an input device to set a number of network devices to be discovered; and
   a setting device to set a discovery repetition period,
   a first discovering device to repeatedly discover the at least one network device with one or more different discovering methods until the set number of network devices are discovered, the first discovering device to discover the network device by discovering a specific object and discovering a non-specific object, the first discovering device including:

a comparison device to compare a number of network devices which have been discovered and a set number; and a rediscovering device to rediscover a non-discovered network device in the network when the number of network devices is not equal to the set number, wherein the discovering methods include a broadcast method, a multicast method and an unicast method and one of the different discovering methods are performed according to a range of the network where the network device reside, wherein the first discovering device discovers the network device during the discovery repetition period until the set number of network devices are discovered.

10. The management server apparatus as claimed in claim 9, wherein the first discovering device discovers the network device in at least one discovering method among a broadcast method of SLP and SNMP, a multicast method, and an unicast method according to a pre-set standard.

11. The management server apparatus as claimed in claim 9, wherein the first discovering device designates an IP address of a specific network device or an IP address range of a specific network device according to a unicast method.

12. The management server apparatus as claimed in claim 9, further comprising:

a second discovering device to discover the network device in the unicast method using an IP address which is individually assigned to each network device in a pre-stored list when the set number of network devices is not discovered until the discovering operation is performed a predetermined number of times.

13. The management server apparatus as claimed in claim 12, further comprising:

a determination device to determine whether a non-discovered network device exists by comparing an IP address of the network device which has been discovered with the unicast method and an IP address of the network device to be discovered.

14. The management server apparatus as claimed in claim 13, wherein when the determination device determines that a non-discovered network device exits, the second discovery device rediscovers the non-discovered network.

15. A management server connected to at least one network device, the management server comprising:

a storage unit to receive and store a list of at least one network device to be discovered;

a setting unit to set a discovery repetition period;

a discovering unit to discover the network device by a unicast method using an IP address which is individually assigned to each network device in the list, the discovering unit including:

a comparison device to compare a number of network devices which have been discovered and a set number; and a rediscovering device to rediscover a non-discovered network device in the network when the number of network devices is not equal to the set number;

a determination unit to determine whether a non-discovered network device exists by comparing an IP address of the network device which has been discovered and an IP address of the network device to be discovered; and a control unit to rediscover the non-discovered network device with different discovery methods if the non-discovered network device exists, and the control unit to discover the network device during the set discovery repetition period until all of the network devices to be discovered are discovered, wherein the different discovery methods being a broadcast method or a multicast method according to a range of the network where the network device reside.

16. The management server as claimed in claim 15, wherein the storage unit stores a list of the network device which has been discovered, and wherein the determination unit determines whether the non-discovered device exists by comparing the list of network devices to be discovered and the stored list of network devices which have been discovered.

17. The management server as claimed in claim 15, wherein the control unit adds the newly discovered network device to the stored list of network devices which have been discovered if a network device is newly discovered by the rediscovering.

18. A method of discovering a network device in a network which comprises at least one network device and a management server, the method comprising:

receiving a set number of network devices to be discovered and a discovery time period with an input device;

setting a discovery repetition period; and repeatedly discovering the at least one network device during the discovery time period until the set number of network devices are discovered with different discovering methods, the discovering including:

comparing a number of network devices which have been discovered and the set number; and when the number of network devices which have been discovered is not equal to the set number, rediscovering a non-discovered network device in the network, wherein the different discovering methods include a broadcast method, a multicast method and an unicast method and one of the different discovering methods are performed according to a range of the network where the network device reside, wherein the discovering comprises discovering the network device during the set discovery repetition period until the set number of network devices are discovered.

19. A method of discovering a network device in a network having at least one network device and a management server, the method comprising:

receiving a list of at least one network device to be discovered with an input unit;

setting a discovery repetition period;

discovering at least one network device with one or more different discovering methods and storing a list of discovered network devices, the discovering including:

comparing a number of network devices which have been discovered and a set number; and when the number of network devices which have been discovered is not equal to the set number, rediscovering a non-discovered network device in the network; and determining whether a non-discovered network device exists by comparing the list of the at least one network device to be discovered and the stored list of discovered network devices, and rediscovering the at least one network device with the one or more different discovering methods to discover the non-discovered network device, wherein the different discovering methods include a broadcast method, a multicast method and an unicast method and one of the different discovering methods are performed according to a range of the network where the network device reside, wherein the discovering comprises discovering the network device during the set discovery repetition period until the set number of network devices are discovered.

20. A method of discovering a network device in a network having at least one network device and a management server, the method comprising:
- receiving a set number of network devices to be discovered and a discovery time period with an input unit;
- setting a discovery repetition period;
- discovering at least one network device during the discovery time period with one or more different discovering methods, the discovering including:
    - comparing a number of network devices which have been discovered and a set number; and
    - when the number of network devices which have been discovered is not equal to the set number, rediscovering a non-discovered network device in the network;
- determining if the number of discovered devices is equal to the received set number of network devices to be discovered; and
- rediscovering at least one network device during the discovery time period with one or more different discovering methods when the number of discovered devices is not equal to the received set number of network devices to be discovered,
- wherein the different discovering methods include a broadcast method, a multicast method and an unicast method and one of the different discovering methods are performed according to a range of the network where the network device reside, and
- wherein the discovering comprises discovering the network device during the set discovery repetition period until the set number of network devices are discovered.

* * * * *

UNITED STATES PATENT AND TRADEMARK OFFICE
CERTIFICATE OF CORRECTION

| | | |
|---|---|---|
| PATENT NO. | : 8,868,723 B2 | Page 1 of 1 |
| APPLICATION NO. | : 12/488725 | |
| DATED | : October 21, 2014 | |
| INVENTOR(S) | : Jae-kyung Cho | |

It is certified that error appears in the above-identified patent and that said Letters Patent is hereby corrected as shown below:

On the Title Page, Item (54) and in the Specification, Column 1, Line 2, the Title, Delete "NETWORK THEREOF" and insert -- NETWORK DEVICE THEREOF --, thereof.

Signed and Sealed this
Nineteenth Day of May, 2015

Michelle K. Lee
*Director of the United States Patent and Trademark Office*